(12) United States Patent
Nikoobakht

(10) Patent No.: US 9,403,678 B2
(45) Date of Patent: Aug. 2, 2016

(54) FILTRATION AND USE OF METAL NANOPARTICLES AS NON-OPTICAL TAGS IN CHEMICAL-, BIO-CHEMICAL SENSORS AND MICRO-ELECTROMECHANICAL DEVICES

(76) Inventor: Babak Nikoobakht, Potomac, MD (US)

( * ) Notice: Subject to any disclaimer, the term of this patent is extended or adjusted under 35 U.S.C. 154(b) by 868 days.

(21) Appl. No.: 13/472,472

(22) Filed: May 16, 2012

(65) Prior Publication Data

US 2012/0292255 A1 Nov. 22, 2012

Related U.S. Application Data

(60) Provisional application No. 61/486,329, filed on May 16, 2011.

(51) Int. Cl.
*B82Y 15/00* (2011.01)
*B01D 63/08* (2006.01)
*B01D 67/00* (2006.01)

(52) U.S. Cl.
CPC ............. *B82Y 15/00* (2013.01); *B01D 63/088* (2013.01); *B01D 67/0062* (2013.01); *B01D 2313/04* (2013.01); *B01D 2323/28* (2013.01); *B01D 2323/283* (2013.01); *B01D 2325/021* (2013.01); *Y10T 29/49117* (2015.01)

(58) Field of Classification Search
CPC ........... B01D 2313/04; B01D 2323/28; B01D 2323/283; B01D 2325/021; B01D 63/088; B01D 67/0062; B82Y 15/00
USPC .............. 210/650, 500.21; 324/692; 436/501, 436/506

See application file for complete search history.

(56) References Cited

U.S. PATENT DOCUMENTS

| | | | |
|---|---|---|---|
| 6,025,202 A * | 2/2000 | Natan ............................ | 436/104 |
| 2006/0257995 A1 * | 11/2006 | Simpson et al. ........... | 435/287.2 |
| 2008/0251723 A1 * | 10/2008 | Ward et al. ................. | 250/338.4 |

\* cited by examiner

*Primary Examiner* — Janet Epps-Smith

(57) ABSTRACT

This disclosure provides methods to use nanoparticles as non-optical tags for detecting a change in mass. chemical sensing or bio-sensing events or reaction upon conjugation of nanoparticles onto a thermoresistor heat sensor. Particularly described is the use of metal nanoparticles in thermal sensors, thermal bio-sensors, and sensing pixel arrays for multiple analyte sensing. In addition, an asymmetric filter is disclosed that allows size separation of molecules from nanoparticles. The asymmetric filter is a porous membrane that is designed to have a small pore size in one size and a large pore size on the other side.

15 Claims, 13 Drawing Sheets

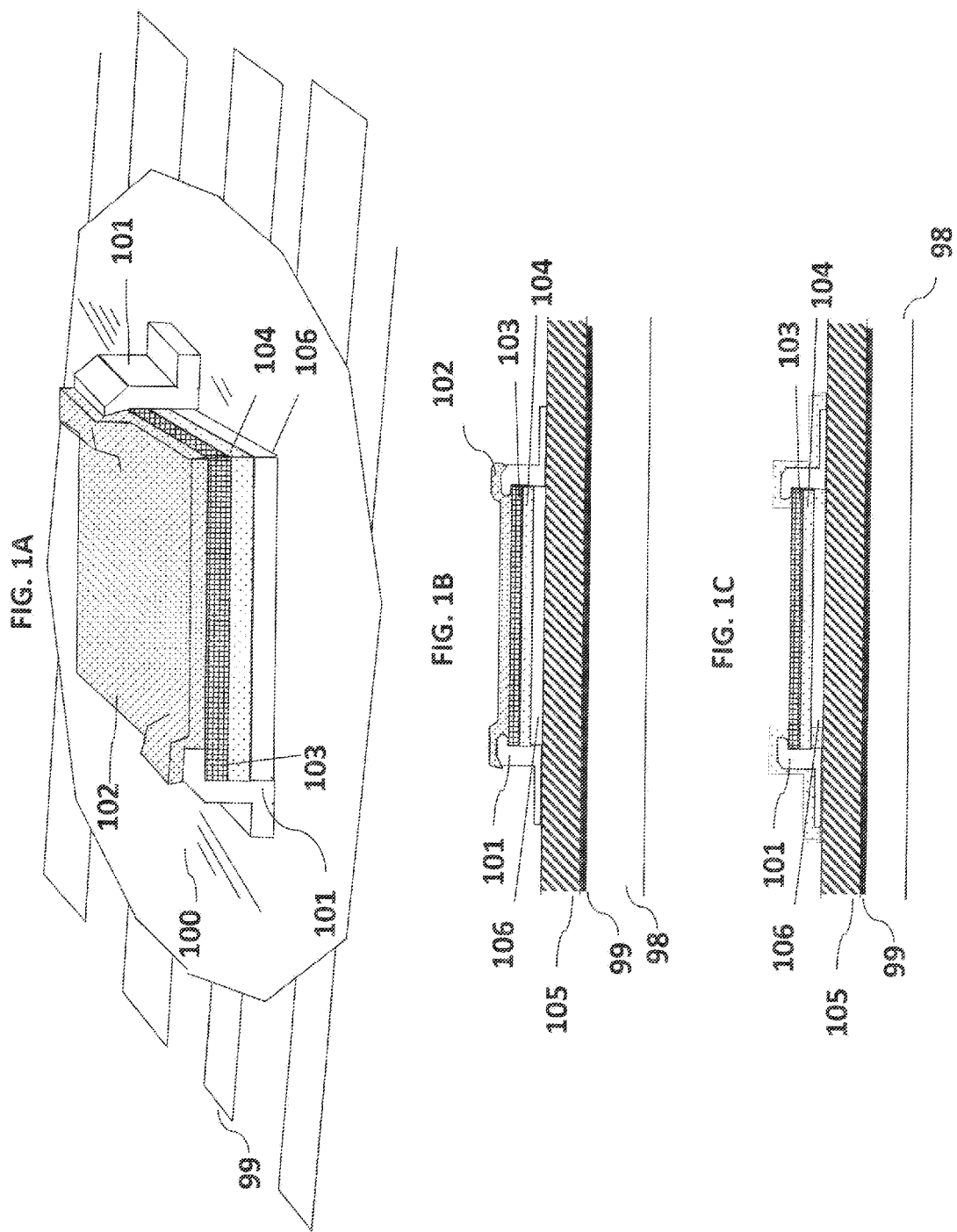

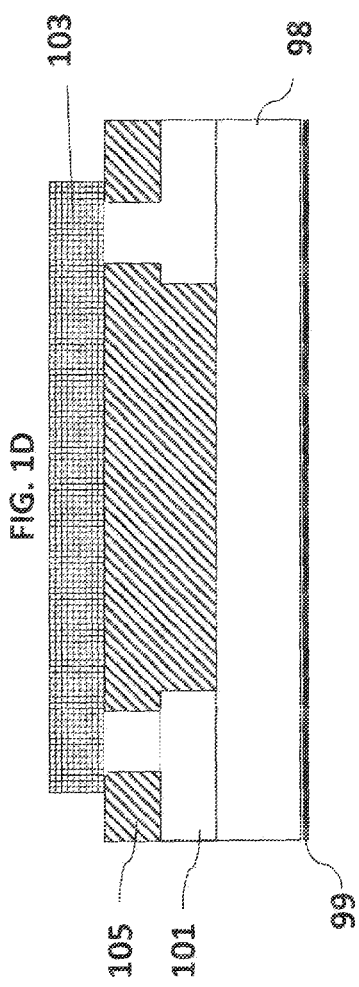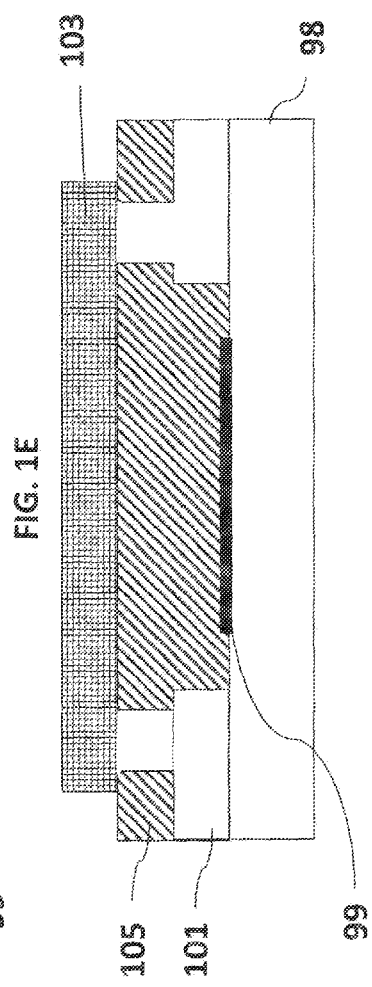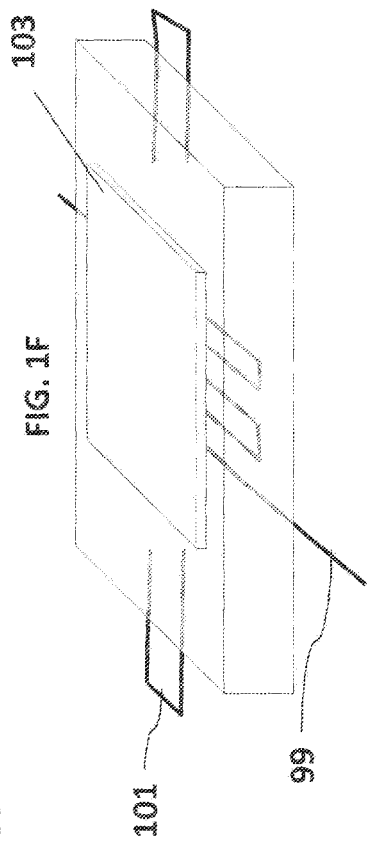

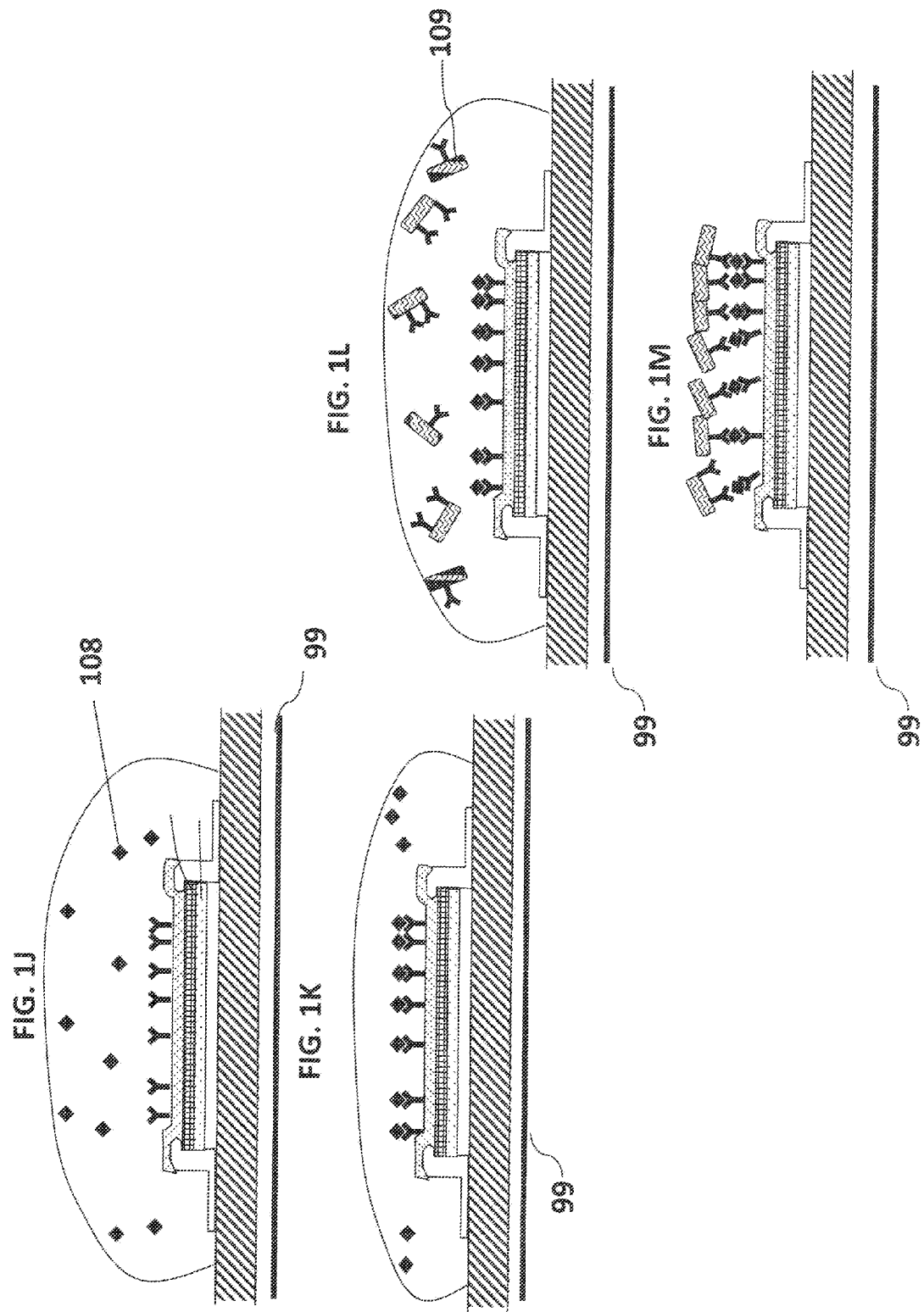

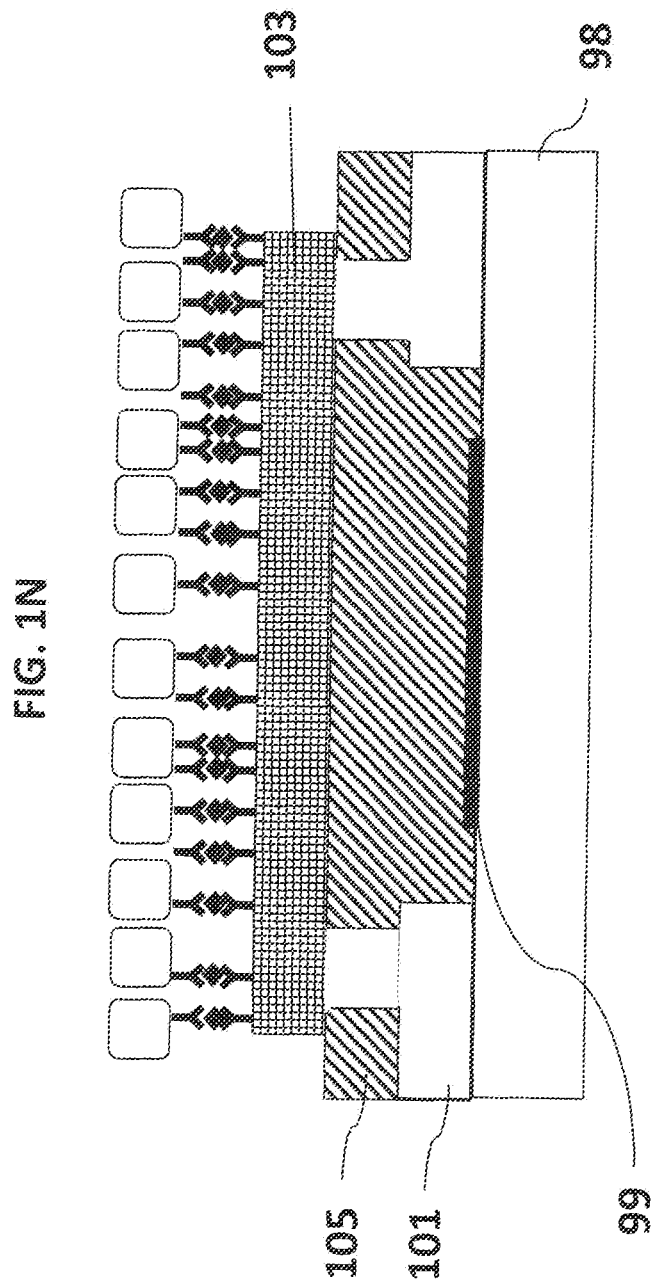

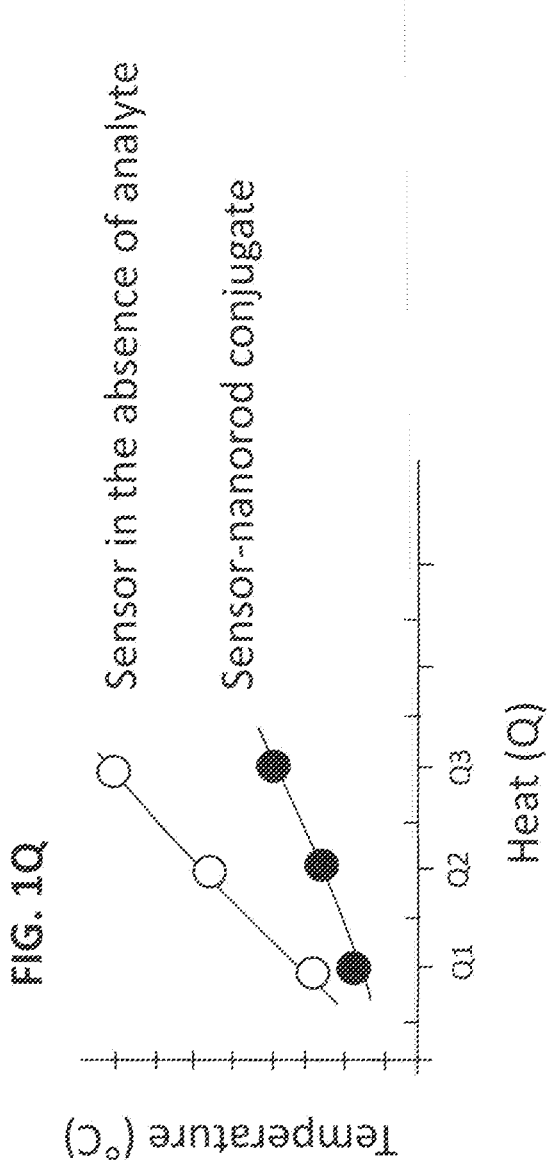

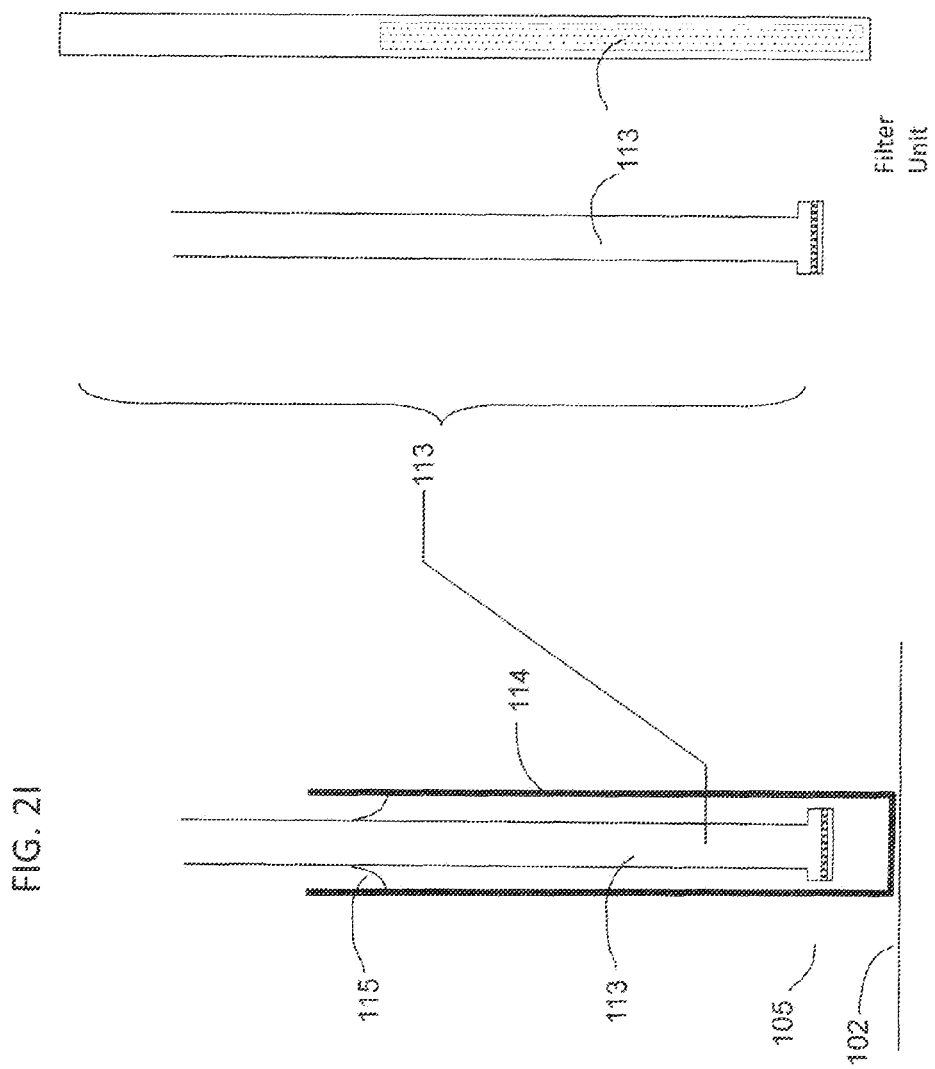

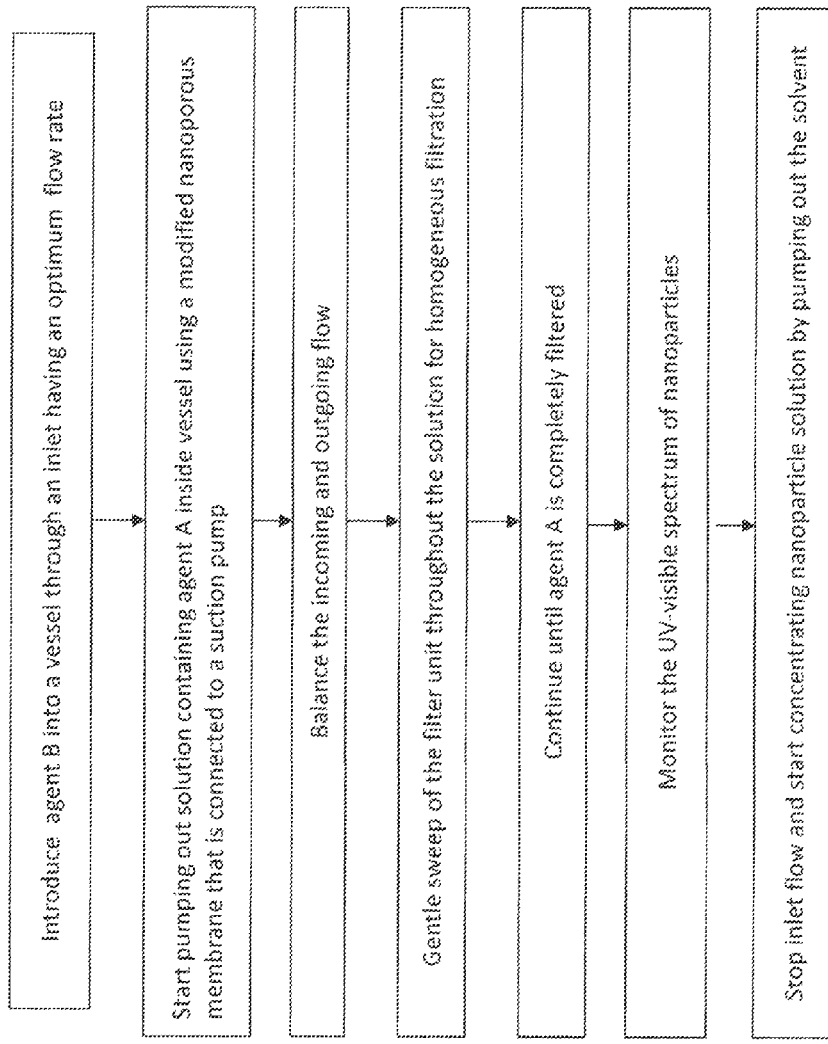

FILTRATION AND USE OF METAL NANOPARTICLES AS NON-OPTICAL TAGS IN CHEMICAL-, BIO-CHEMICAL SENSORS AND MICRO-ELECTROMECHANICAL DEVICES

CROSS-REFERENCE TO RELATED APPLICATION

The present application claims priority to U.S. patent application No. 61/116,638 filed Nov. 21, 2008, and provisional patent application No. 61/486,329, the disclosure of which is herein incorporated by references in its entirety.

TECHNICAL FIELD OF INVENTION

This invention relates in general to application of metal and semiconductor nanocrystals or nanoparticles to detect a chemical or biosensing event via increasing the thermal mass or mass of a microdevice such as a MEM device, photonic device. etc. Particularly described in here is the use of metal nanocrystals and semiconductors in an electrical biosensing platform for achieving a sub-femtomolar concentration detection of bio-species such as proteins, DNA, viruses, bacteria, etc. The invention thus includes disclosing a novel thermal biosensor for single and multi-component sensing that functions based on principles of thermal detectors. This invention also relates in general to application a novel nanofilter for separation, purification, concentration of particles, micro particles and nanoparticles.

BACKGROUND INFORMATION

This invention pertains to bio-sensors and non-optical tags and is based on thermal detectors or thin film thermoresistor type detectors in which a known amount of heat is used to change the resistivity of a thermoresistor sensor. To detect a biosensing event, there must be some type of measurable response. A popular route is use of optical excitation of fluorescence-tagged analytes or species that results in their optical emission which must be collected and analyzed for sample analysis. Such setups have been typically bulky, expensive and sophisticated preventing the development of portable and small size biosensors.

SUMMARY OF INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

In this invention different classes of nanocrystals are introduced as agents for increasing the mass of a thermal sensor. These nanomaterials due to their adjustable size can have an enormous effect on behavior of a thermal detector response and other solid state devices that to function require heat absorption or generation events. One objective of this invention is to detect a biosensing event or reaction upon binding of metal or semiconductor nanoparticles onto a thermoresistor thermal sensor. The detection of a bio-specie is confirmed by accumulation of nanoparticles at the sensor surface. We use this accumulation to detect the analyte in a merely electrical sensor via a measurable temperature change in the sensor. When a biosensing event occurs on the sensor surface, tagged nanoparticles bind to its surface; as a result the thermal mass or mass of the sensor increases. This increase in thermal mass influences the pattern of temperature change of the sensor once it is given a known amount of heat. This temperature change of the sensor is transmitted or recorded by a read-out integrated circuit. The disclosed biosensors have multitudes of applications in chemical sensing such as detection of organic, gas and biomolecules. In another aspect of this invention a modified nanofilter is developed by which a symmetric porous nanofilter is converted to an asymmetric one. Therefore one side of the filter has smaller size filters with respect to the other side. In this invention, the smaller pores are precisely controlled in size allowing selective filtration of objects with different sizes.

The invention will become more clear from the following detailed description of embodiments, taken in conjunction with the drawings, wherein.

DETAILED DESCRIPTION

Figure 1G:
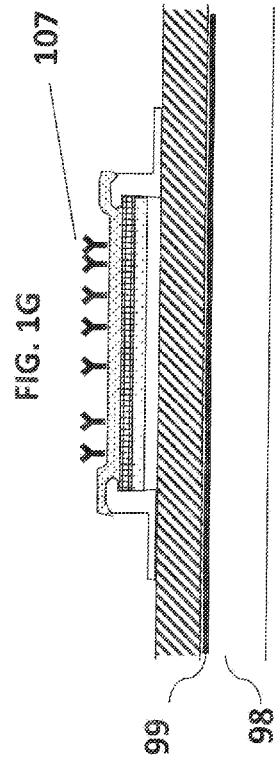
FIG. 1: (A) three-dimensional and (B) cross-sectional views of a sensor according to one aspect of the disclosure. (C) In one aspect of the disclosure, the sensing area is not coated with the silicon oxide layer, but the contact electrodes are coated. (D) A sensor with contact electrodes and a heating element embedded in a non-conductive layer according to one aspect of the disclosure. (E) A sensor with a heating element that is placed between the conductive electrodes according to one aspect of the disclosure. (F) same sensor view from an oblique angle. (G) Surface functionalized sensor with a bio-receptor such as an antibody according to one aspect of the disclosure. (H) Surface functionalized sensor with a bio-receptor such as an antibody according to one aspect of the disclosure. (I) Surface functionalized sensor with a bio-receptor such as an antibody according to another aspect of the disclosure. (J) Introduction of the solution that contains a bio-specie. (K) Binding of biospecies to the functionalize surface according to one aspect of the disclosure. (L) Introduction of functionalized metal nanoparticles with an appropriate receptor such as an antibody according to one aspect of the disclosure. (M) Binding of functionalized metal nanoparticles such as gold nanorods according to one aspect of the disclosure. (N) Binding of functionalized metal nanoparticles according to one aspect of the disclosure. (O) Three-dimensional view of the FIG. 1M according to one aspect of the disclosure. (P) Three-dimensional view of the FIG. 1N according to one aspect of the disclosure. (Q) Temperature rise of a sensor upon controlled heating. (Filled circles) A sensor that is conjugated with nanoparticles due to the sensing event has a larger thermal mass thus its temperature changes slower. (Open circles) A non-conjugated sensor (without nanoparticles) due to its smaller thermal mass heats up faster and thus its temperature changes faster.

In this invention different forms of applications of metal and semiconductor nanocrystals in detecting a biosensing event using microelectromechanical (MEMs), thermoresistors, resistance temperature detectors, bimetallic sensors, thermopiles and bolometers are illustrated. This invention may, however, be embodied in many different forms and should not be interpreted as limited to the examples set forth herein. Furthermore, the disclosure uses gold nanorods as an exemplary nanocrystal. However, nanomaterials of other noble metals such as silver, copper, platinum, and the like can be used in the devices disclosed herein. A nanocrystal surface could be protected by different organic molecules or inorganic layers. Also, whenever the disclosure refers to gold nanorods, it is to be understood that other nanocrystals shapes such as nanospheres, nanostars, nanoshells and nanoprisms (triangular shapes) may take the place of nanorods. A person skilled in the art would appreciate that the fabrication methods and devices disclosed herein can be used to incorporate other nanomaterials without undue experimentation and as such the scope of the disclosure is intended to include all those applications.

As used in this application, the term "nanorod" is intended to include solid cylindrical objects that have a width smaller than about 100 nm and a length less than about 2000 nm. In this application, the following terms are meant to be synonymous with "nanorod": rod shaped gold nanocrystals, cylindrical shaped gold nanocrystal, spheroidal shaped gold nanocrystal, gold nanorods, and one-dimensional gold nanocrystals. The term "nanocrystal" is intended to include tiny crystals with at least one dimension less than about 100 nm in size. The term "nanoparticle" is intended to include nanocrystals with different shapes that have at least one dimension less than about 100 nm.

Gold nanorods due to their aspect ratio could absorb and scatter light in a broad region of the electromagnetic spectrum including visible and infrared. In the disclosed invention, gold nanorods regardless of their method of preparation can be used. In this invention gold nanorods with aspect ratios larger than two are used due to their optical activities in the aforementioned regions. Such nanoparticles are prepared by a seed-assisted method and/or an electrochemical method using porous membranes as template for growth of one-dimensional metal nanorods. Examples of pore specifications of the used membranes include pore diameters of about 10 to 30 nm and lengths of about 0.3 micron to 2 microns. Examples of membrane materials could be polycarbonate or anodized aluminum oxide.

In the disclosed sensor designs, different ways of chemical and biosensing using nanoparticles are discussed. In these designs, nanoparticles get attached to a thermal microsensor using different biosensing recognition events. The bound nanoparticles on the microsensor increase its thermal mass. In the case of a thermoresistor microsensor, increase in the thermal mass increases the heat capacity of the sensor leading to its slower temperature change. This slower change is used as an indicator to sense a biorecognition event. The coupled microsensor and nanocrystals are integrated to a read-out-integrated circuit, where change in the temperature can be recorded. In another embodiment, semiconductor nanocrystals in conjunction with metal nanoparticles are used to modify the thermal mass of the microsensor upon occurrence of the biosensing event.

In FIG. 1A and FIG. 1B, three-dimensional and cross-sectional views of a microsensor thermometer device (100) are shown, respectively. The device is built on any suitable substrate material (105), solid or flexible such as silicon oxide, monocrystalline silicon wafer or an organic thin film. Fabrication is performed using conventional microfabrication and etching protocols. In one aspect of the disclosure, the silicon oxide layer (105) hosts two metal electrodes of (101). The silicon oxide layer acts as a dielectric and thermal barrier. The metal electrodes are connected to readout electronics, not shown here. In one embodiment, the sensing element is an amorphous silicon or titanium layer (103) with a thickness of about 2 nm to 500 nm. This layer is deposited on a thermal isolation (104) and a buffer layer (106). In one embodiment, the layer (104) is a silicon oxide, silica gel, organic layer such as poly methyl methacrylate, or other materials with optimum heat conductivity and capacity. Layer (104) is formed on a silicon nitride layer (106) or any other suitable dielectric material with a thickness of 20 nm to 500 nm. In FIG. 1B it is shown that the sensing element (103) is coated with a thin silicon oxide layer (102) with a thickness of about 10 to 500 nm. In another aspect of this disclosure, only the conductive electrodes (101) are passivated with a non-conductive layer, such as silicon oxide, with a thickness of about 10 nm to 500 nm (FIG. 1C). In one aspect of this disclosure, as shown in (FIGS. 1B and 1C) a heating element (99) is fabricated on a substrate (98) using microfabrication protocols. Substrate (98) can be any crystalline or amorphous inorganic or organic substrates such as silicon, silicon oxide, silicon nitride, poly methyl methacrylate, or parylene. In another aspect of this invention, as shown in FIG. 1D, metal electrodes (101) are coated with an electrically non-conductive layer. The sensing layer (103) is then deposited using photolithography and microfabrication on the electrodes (101). The position of the heating element (99) can be varied; for instance, in one embodiment in FIG. 1E, the heating element (99) is fabricated under layer (98). In another embodiment, in FIG. 1E, the heating element is fabricated between the electrodes (101). An oblique view of this embodiment is depicted in FIG. 1F.

Figure 1H:
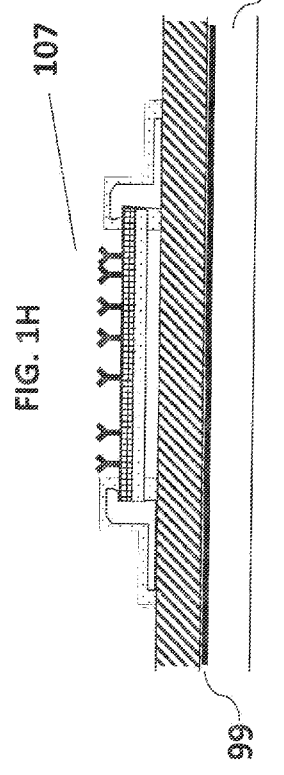
Figure 1I:
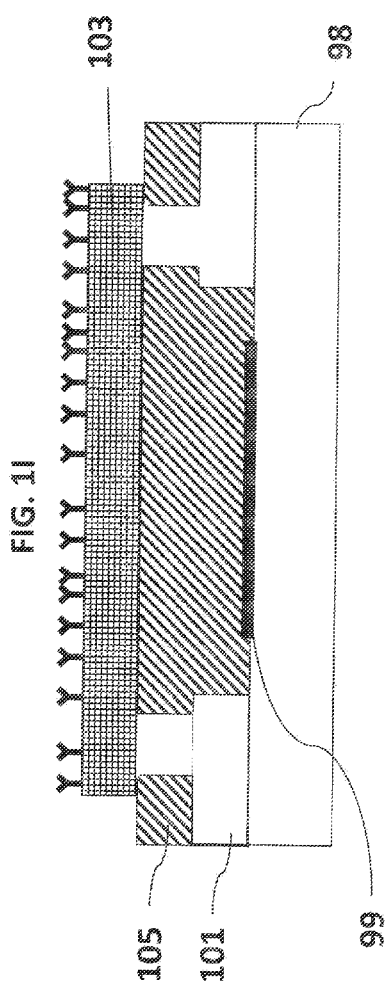
Figure 1O:
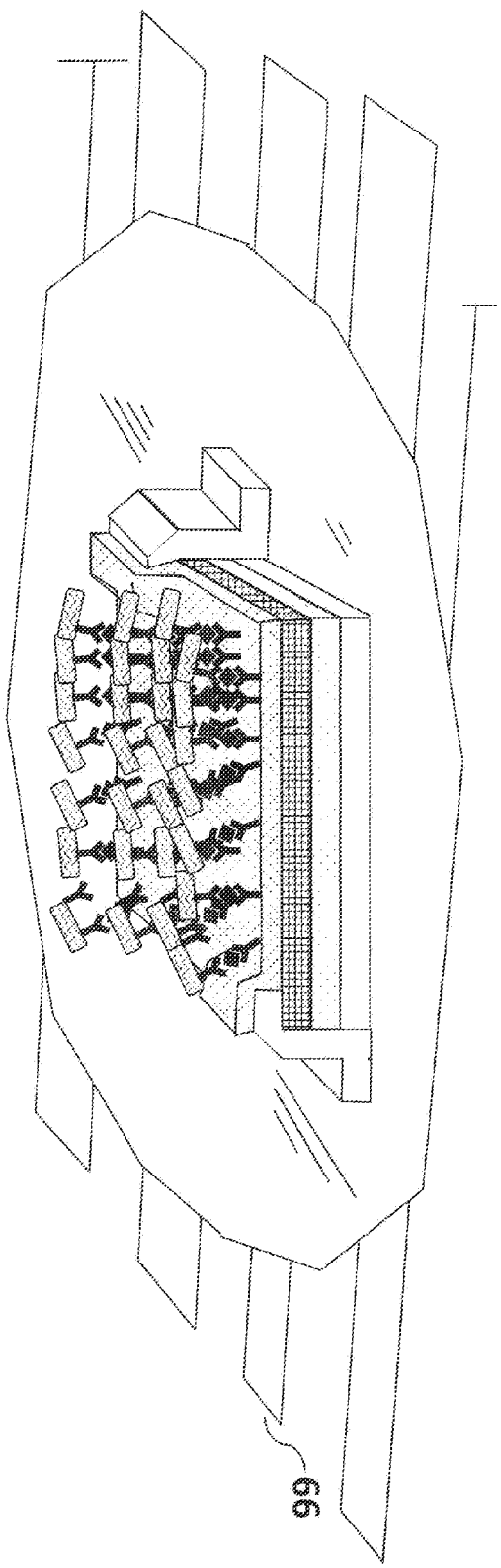
Figure 1P:
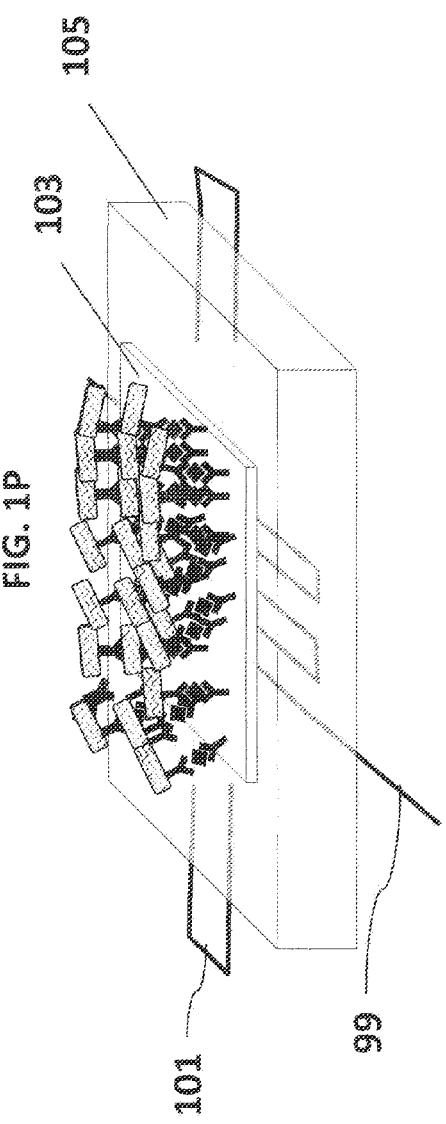

The sensing element is surface functionalized with a bio-receptor (107) such as an antibody, DNA molecule or a protein receptor. These bio-receptors are bound to layer (102) or (103) via known thiol chemistry, silicon chemistry and/or wet chemistry techniques, in one aspect of this disclosure. This functionalization is shown for a number of used designs (FIG. 1G-1I). To this surface (FIGS. 1J, and 1K) a small droplet containing analyte (108) is added which binds to the bio-receptor (107). Then a solution of bioconjugated gold nanorods or nanoparticles (109) is added to the sensor (FIG. 1L). Bioconjugation includes attachment of moieties such as an antibody, DNA molecule or a protein receptor to metal nanoparticles such as gold nanorods. In the presence of the analyte (108), gold nanorods or nanoparticles bind to the surface of sensor, as illustrated in FIG. 1M. For clarity a sensor-nanoparticle conjugate is called "conjugated" and a sensor in the absence of any nanoparticle conjugation is called "non-conjugated". A sensor in its "conjugated" state is depicted in another embodiment shown in FIG. 1N. These states are also shown in oblique views in FIGS. 1O and 1P. Note that in FIG. 1P, only part of the layer (105) is shown to better demonstrate the position of the contacts (101).

By introducing a known amount of heat, Q, by heating element (99) to a conjugated sensor its temperature changes. However, temperature of a conjugated sensor changes slower than that of a non-conjugated one. A conjugated sensor has a higher thermal mass with respect to a non-conjugated sensor; therefore for the two states above the temperature would change differently. The temperature of a sensor is measured using its resistivity change, thus the developed sensor is fully electrical with no need to any optical detection or excitation setup. In one aspect of this disclosure, to test the presence of an analyte, a sensor is heated at three different values of Q1, Q2, and Q3, and their corresponding temperatures are probed by measuring their resistivities. These series of temperatures ($T_1$ to $T_3$) are compared to those of the same sensor before sensor exposure to analyte ($T_1'$ to $T_3'$). If the analyte of interest exists in the sample, the temperatures values (e.g., $T_1$ and $T_1'$) at a given heating cycle (e.g., $Q_1$) are different confirming the occurrence of nanoparticle binding to the sensor and thus the presence of the analyte of interest. In addition, to comparing sensor temperature, the slope $\Delta T/\Delta Q$ can be used to deduce the presence of an analyte (FIG. 1Q). This sensing device also called pixel can be fabricated in array formats for simultaneous or serial detection of multiple analytes.

Figure 2C:
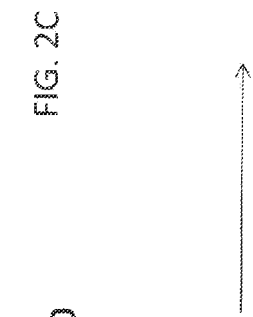
FIG. 2: (A) Top view of a nanoporous filter. (B) Side view of a nanoporous filter; the pore size remains constant along the length of the channel. (C) Top view of a nanoporous filter after deposition of a thin film with known thickness. (D) Side view of a nanoporous filter after deposition of a thin film with known thickness; the immediate entrance of the filter narrows down to a known diameter. (E) Side view of a nanoporous filter after deposition of a thin film with known thickness and its etching from the side with larger pore side. (F) Side view of the asymmetric membrane on a larger scale. (G) Side view of the asymmetric membrane with an etched backside on a larger scale. (H) Filter after being assembled to a filter holder. (I) Side view of a container that includes the filter unit. Inset shows two different designs for a filter. In the left one the size of the filter is small and circular and in the right one, the filter is large and in a rectangular shape. (K) Flow chart of the steps for filtration and concentrating a solution using a filter unit.
Figure 2D:
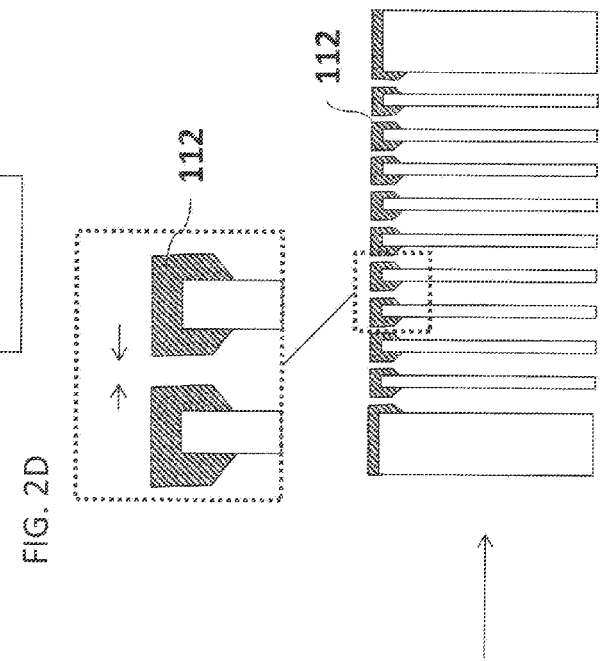
Figure 2A:
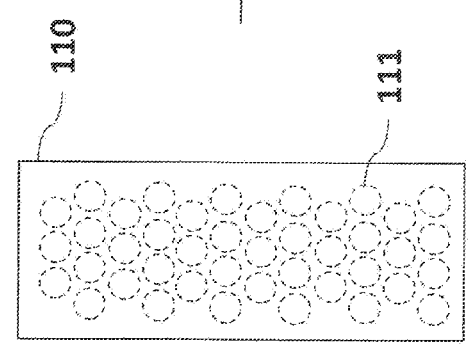
Figure 2B:
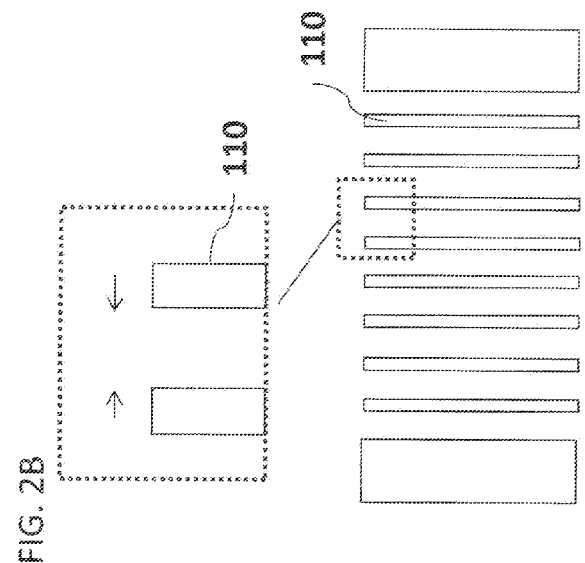

In another aspect of this disclosure, a filter is disclosed that is used for size selective separation of objects from a solution. FIG. 2A shows the top view of a nanoporous filter (110) that contains close-packed nanopores (111) that extend across the thickness of the membrane (FIG. 2B). In such porous filters the diameter of the pore is in the range of about 20 nm to 500 nm that remains constant along the pore and its length is in the range of tens of microns. In one aspect of this disclosure, One side of the membrane filter (110) is coated with a thin film (112). This film can be organic or inorganic. Inorganic materials are such as silicon oxide, silicon nitride, etc. Methods of deposition could be spin casting or vapor deposition such as plasma enhanced chemical vapor deposition (PECVD). Organic films could be conductive or insulators polymers such as poly methyl methacrylate, poly-thiophen, poly (p-xylene) polymers or parylene. Depending on the original pore size and the thickness of the deposited film, the diameter of the modified nanopore could be reduced to 1 nm or less and precisely controlled. The top view and profile of the modified filter is shown in FIG. 2C and FIG. 2D, respectively.

Figure 2E:
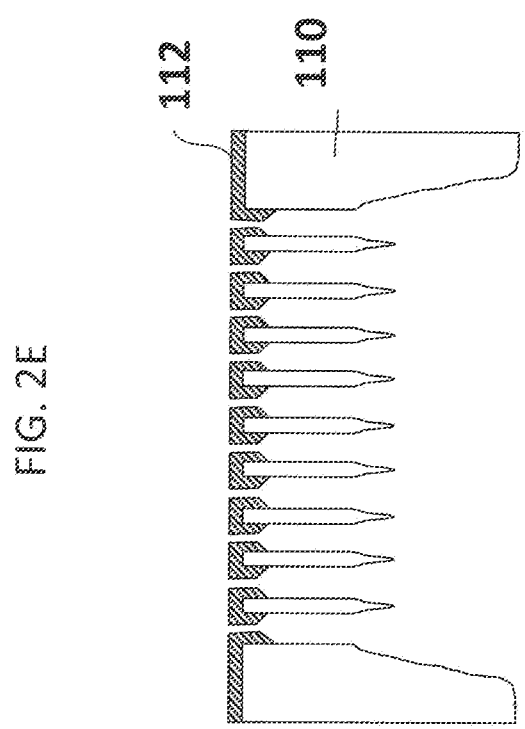
Figure 2F:
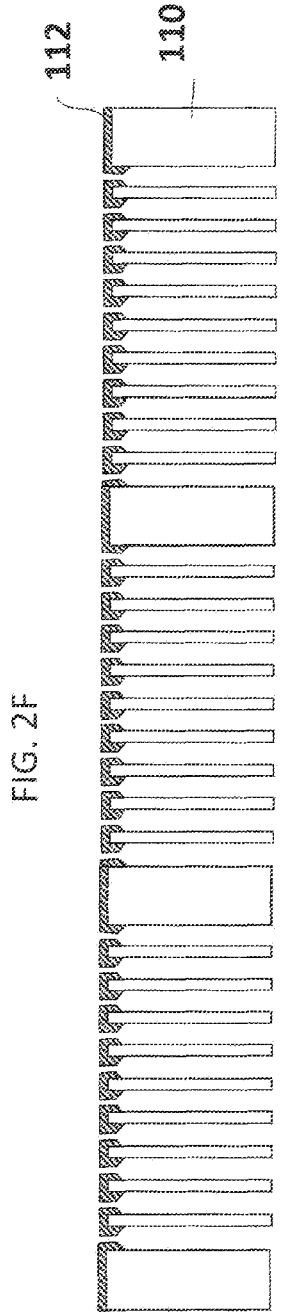
Figure 2G:
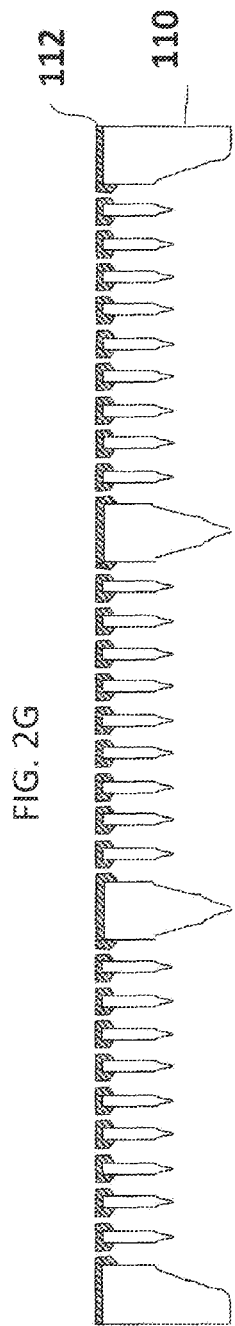
Figure 2H:
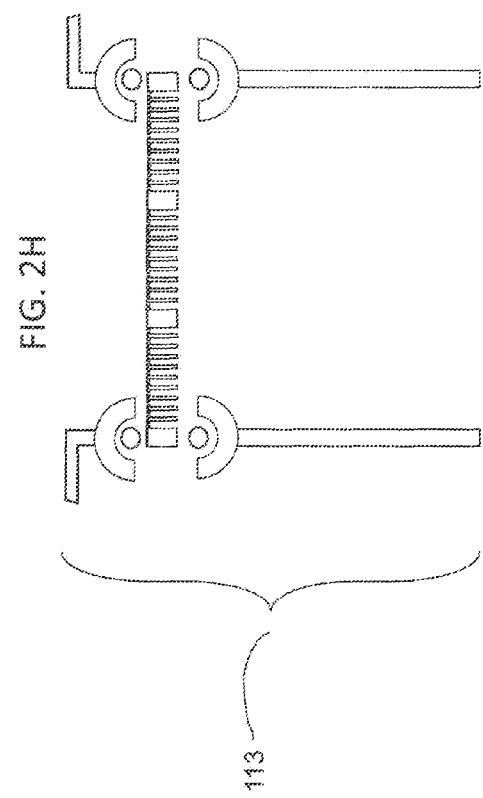
Figure 2J:
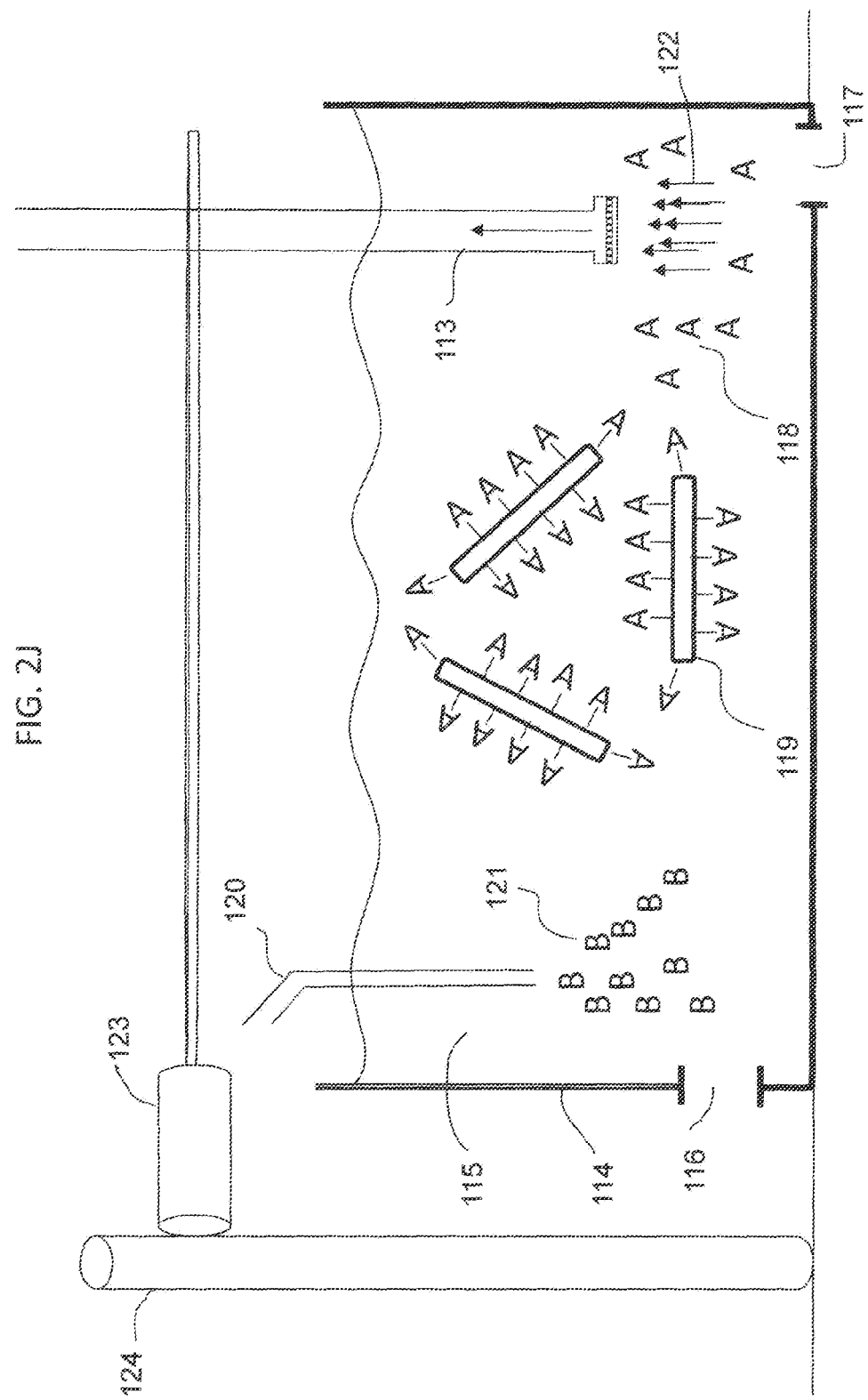

In another aspect of this disclosure, the uncoated side of the nanoporous membrane is chemically etched via known techniques such as wet chemistry using for instance concentrated KOH solution or reactive ion etching methods. Etching results in reduction in the thickness of the membrane as well as an increase in the diameter of the pore as illustrated in FIG. 2E. The back-etch of the membrane eases the passage of solution through the membrane. In another embodiment shown in FIG. 2F and FIG. 2G, the modified filters are shown on a larger scale. Assembly of such filters to a holder is shown in FIG. 2H. In yet another embodiment, the assembled filter (113) shown in FIG. 2H is used in a container (114) containing metal nanoparticles for the purpose of filtering out liquid (115) and objects below a specific size. The size specificity is determined by the size of the nanopores. Since this technique allows a fine control over the pore size, in one aspect of this disclosure, using a pore size of about 2 nm to 5 nm, it is possible to just remove organic molecules such as surfactants and the solution. The nanoporous filter used in filter unit (113) can have different shapes as shown in the inset of FIG. 2I. In this figure, a larger area nanofilter is used in shape of a rectangle. The side view of container (114) is shown in FIG. 2J. This container has an inlet (116) for filling the container with a solution, and has an outlet (117) for draining the solution after filtration.

In one aspect of this invention, filter unit (113) is used for removing a specific molecule A (118), in FIG. 2J, that is the dominant molecule in the container. This molecule can be adsorbed on surface of particles (119) or free in solution. An inlet (120) is used to introduce a new solution containing molecules B (121). This solution could be aqueous or a mixture of aqueous and non-aqueous solutions. Molecules A and B can be long or short chain organic moieties such as charged and neutral surfactants, thiols, amines, amino-acids, DNA, proteins, viruses, and other biological species. As molecules B (in a solvent) are inserted in the container, filter (113) is used to filter out (122) the dominant molecules A. By continuing the filtration process, molecule B becomes the dominant specie of the solution (115). In addition, particles (119) are also surface adsorbed by this molecule. In another aspect of this invention, the filter (113) is moved in the container by a motorized arm (123) that is mounted on a stand (124). Move of the filter allows a homogenous filtration throughout the solution.

It will be understood by those skilled in the art that the sensors and detectors as disclosed above can be used in a variety of devices in place of prior IR sensors, bio sensors, chemical sensors, micro array biosensors, etc. It will also be understood by those skilled in the art that the filters disclosed above can be used in a variety of applications for size separation, purification, concentrating, etc.

In summary, biosensor devices are disclosed as sensors that are fully electrical. Metal nanoparticles such as gold nanorods, due to their adjustable size and biocompatibility, are used as thermal mass enhancers in a thermal sensor. This property enables nanorods or nanoparticles to be used as non-optical tags instead of, for instance, fluorescence tags in optical detection and sensing. With respect to the disclosed filter, the modified filter allows us to separate molecules from nanoparticles in a way that has not been achieved before.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims.

The invention claimed is:

1. A nanoengineered device, comprising:
   a base substrate coated with a non-conductive layer; wherein at least one conductive layer is deposited over the non-conductive layer, wherein the device response depends on the resistivity of the conductive layer; wherein a heat source is embedded under the conductive layer; wherein the heat source changes the resistivity of the conductive layer; wherein the heated conductive layer receives at least one metal nanoparticle, further wherein the at least one metal nanoparticle is precipitated due to its binding to the device, wherein the at least one metal nanoparticle forms electrically non-conductive junctions to device, further wherein the at least one metal nanoparticle operably changes resistivity and output voltage of sensor, wherein the device response is measured via two embedded metal electrodes in the non-conductive layer.

2. The nanoengineered device of claim 1, wherein the at least one metal nanoparticle is selected from the group consisting of a nanorod, nanosphere, nanoprism, nanocube, nanoshell, nanotube, and nanostar.

3. The nanoengineered device of claim 1, wherein the at least one noble metal is selected from the group consisting of gold, silver, copper, Platinum.

4. The nanoengineered device of claim 3, wherein the at least one noble metal nanoparticle is a gold nanorod.

5. The nanoengineered device of claim 1, wherein the at least one conductive layer has a thickness of between about 10 nm and about 500 nm.

6. The nanoengineered device of claim 1, wherein the at least one non-conductive layer comprises at least one dielectric layer.

7. The nanoengineered device of claim 1, wherein the at least one metal nanoparticle has an aspect ratio greater than or equal to about one.

8. The nanoengineered device of claim 5, wherein the at least one conductive layer is a semiconductive layer.

9. The nanoengineered device of claim 1, further comprising at least one conductive layer, wherein a heating element gives heat to the at least one conductive layer.

10. The nanoengineered device of claim 1, further comprising at least one conductive layer, wherein a plurality of metal nanoparticles are precipitated on the conductive layer.

11. The nanoengineered device of claim 9, wherein the at least one conductive layer is treated with one or more receptors or linking molecules selected from the group consisting of dithiols, diamines, antibodies, DNAs, biotin, proteins and pathogens.

12. The nanoengineered device of claim 1, wherein the device is selected from the group consisting of a sensor, handheld device, optics-free sensor, a bio-sensor, and a device that includes at least one nanoparticle-based pixel.

13. A method of forming a nanoengineered device, comprising forming:
    a base substrate;
    a non-conductive layer over the base substrate;
    a first conductive layer over the non-conductive layer;
    a dielectric layer over the first conductive layer;
    a pair of embedded electrodes connected to the conductive layer for device read-out;
    a plurality of biological receptors over the first conductive layer; or
    a plurality of biological receptors over the dielectric layer;
    a plurality of analyte to a receptor-functionalized layer;
    a plurality of receptor-functionalized nanoparticles over a receptor-functionalized layer;
    wherein the precipitation of the at least one metal nanoparticlos forms electrically non-conductive junctions to device, wherein the at least one metal nanoparticle operably changes the device response.

14. The device of claim 13 further can be manufactured in arrays for detecting multiple analytes.

15. The nanoengineered device of claim 1, wherein the sensor response is defined by change in resistivity of the conductive layer over time.

* * * * *